US011846475B2

(12) United States Patent
Hitchcock et al.

(10) Patent No.: US 11,846,475 B2
(45) Date of Patent: Dec. 19, 2023

(54) HEAT EXCHANGER FOR A POWER CONNECTOR

(71) Applicant: TE CONNECTIVITY CORPORATION, Berwyn, PA (US)

(72) Inventors: Matthew Bryan Hitchcock, Hershey, PA (US); Nathan Philip Myer, Lancaster, PA (US); Clara Marguerite Rhodes, Winston Salem, NC (US); David Bruce Sarraf, Elizabethtown, PA (US); Ryan David Hetrick, Carlisle, PA (US); Kevin John Peterson, Kernersville, NC (US)

(73) Assignee: TE Connectivity Solutions GmbH

( * ) Notice: Subject to any disclaimer, the term of this patent is extended or adjusted under 35 U.S.C. 154(b) by 330 days.

(21) Appl. No.: 16/939,200

(22) Filed: Jul. 27, 2020

(65) Prior Publication Data

US 2021/0063097 A1  Mar. 4, 2021

Related U.S. Application Data

(60) Provisional application No. 62/891,731, filed on Aug. 26, 2019.

(51) Int. Cl.
| *F28F 9/02* | (2006.01) |
| *H01M 10/6556* | (2014.01) |
| *F28F 1/02* | (2006.01) |
| *F28D 21/00* | (2006.01) |

(52) U.S. Cl.
CPC .......... *F28F 9/0253* (2013.01); *F28F 1/022* (2013.01); *F28F 9/0212* (2013.01); *H01M 10/6556* (2015.04); *F28D 2021/0028* (2013.01)

(58) Field of Classification Search
CPC .... H01M 10/6556; F28F 1/022; F28F 9/0212; F28D 2021/0028
USPC .......................................................... 165/175
See application file for complete search history.

(56) References Cited

U.S. PATENT DOCUMENTS

| 10,449,871 B1 * | 10/2019 | Lyon ...................... B60L 53/14 |
| 10,535,940 B2 * | 1/2020 | Fuehrer .................. B60L 53/16 |
| 10,644,439 B2 * | 5/2020 | Fuehrer .................... B60L 1/04 |
| 10,675,988 B2 * | 6/2020 | Fuehrer .................. B60L 53/18 |

(Continued)

FOREIGN PATENT DOCUMENTS

| CN | 107887730 A | 4/2018 |
| EP | 3267447 A1 | 1/2018 |

OTHER PUBLICATIONS

International Search Report, International Application No. PCT/IB2020/057990 dated Aug. 26, 2019.

*Primary Examiner* — Jon T. Schermerhorn, Jr.

(57) ABSTRACT

A power connector includes a housing having a terminal channel and a terminal received in the terminal channel including a mating pin at a front of the terminal and a cable connector at a rear of the terminal. The mating pin is positioned in the terminal channel for mating with a charging connector. The cable connector includes a pad configured to be terminated to a power cable. The power connector includes a heat exchanger thermally coupled to the pad of the terminal. The heat exchanger includes a coolant channel for coolant flow through the heat exchanger for actively cooling the terminal. The heat exchanger includes a thermally conductive separator electrically isolating the heat exchanger from the pad of the terminal.

26 Claims, 8 Drawing Sheets

(56) References Cited

U.S. PATENT DOCUMENTS

| | | | |
|---|---|---|---|
| 10,756,498 B1* | 8/2020 | Sarraf | B60L 53/302 |
| 2005/0173100 A1* | 8/2005 | Takai | F28F 9/0224 |
| | | | 165/149 |
| 2007/0246207 A1* | 10/2007 | Nakamura | F02M 26/32 |
| | | | 165/173 |
| 2008/0229580 A1* | 9/2008 | Anderson | F28F 3/12 |
| | | | 257/E23.098 |
| 2015/0217654 A1* | 8/2015 | Woo | B60L 53/16 |
| | | | 320/109 |
| 2017/0314515 A1* | 11/2017 | Oono | H01L 23/4334 |
| 2018/0034197 A1* | 2/2018 | Lyon | H01R 13/7137 |
| 2019/0315239 A1* | 10/2019 | Beimdieck | B60L 53/16 |
| 2020/0067237 A1* | 2/2020 | Sarraf | G01K 7/42 |
| 2020/0207400 A1* | 7/2020 | Sakuda | B62D 1/195 |
| 2020/0223321 A1* | 7/2020 | Myer | H01R 13/4223 |
| 2020/0266578 A1* | 8/2020 | Durse | H01R 13/533 |

\* cited by examiner

HEAT EXCHANGER FOR A POWER CONNECTOR

CROSS-REFERENCE TO RELATED APPLICATIONS

This application claims priority to U.S. Provisional Application No. 62/891,731, filed 26 Aug. 2019, titled "Brazed Heat Exchanger for Active Cooled Charging Inlet," which is incorporated by reference herein in its entirety.

BACKGROUND OF THE INVENTION

The subject matter herein relates generally to heat exchangers for power connectors.

Electrical connectors, such as power connectors, generate heat when current flows through the terminals and cables of the power connectors. For example, a power connector of a charging inlet assembly for a battery system of an electric vehicle (EV) or hybrid electric vehicle (HEV) may generate heat through the terminals and the cables of the charging inlet assembly during a charging process. A charging connector is configured to be mated with the terminals of the charging inlet assembly to charge the battery system of the vehicle. It is desirable to increase the current transmitted through the terminals for charging the battery. However, at higher currents, the terminals and the power cables experience an increase in temperature, which may damage the components of the charging inlet assembly.

A need remains for a cooling system for cooling a power connector, such as for a charging inlet assembly.

BRIEF DESCRIPTION OF THE INVENTION

In one embodiment, a power connector is provided including a housing extending between a front and a rear having a chamber at the rear and a terminal channel between the front and the rear. The power connector includes a terminal coupled to the housing including a mating pin at a front of the terminal and a cable connector at a rear of the terminal. The mating pin is positioned in the terminal channel for mating with a charging connector. The cable connector is positioned in the chamber at the rear of the housing including a pad configured to be terminated to a power cable. The power connector includes a heat exchanger positioned in the chamber. The heat exchanger is thermally coupled to the pad of the terminal. The heat exchanger includes a coolant channel for coolant flow through the heat exchanger for actively cooling the terminal. The heat exchanger may include a thermally conductive separator electrically isolating the heat exchanger from the pad of the terminal.

In another embodiment, a charging inlet assembly for an electric vehicle is provided including a housing extending between a front and a rear having a chamber at the rear and a power connector at the front for receiving a charging connector. The power connector includes a first terminal channel and a second terminal channel between the front and the rear. The charging inlet assembly includes a first and second terminals coupled to the housing. The first terminal includes a first mating pin at a front of the first terminal and a first cable connector at a rear of the first terminal. The first mating pin is positioned in the first terminal channel for mating with the charging connector. The first cable connector is positioned in the chamber at the rear of the housing and includes a first pad configured to be terminated to a power cable. The second terminal includes a second mating pin at a front of the second terminal and a second cable connector at a rear of the second terminal. The second mating pin is positioned in the second terminal channel for mating with the charging connector. The second cable connector is positioned in the chamber at the rear of the housing and includes a second pad configured to be terminated to a power cable. The charging inlet assembly includes a heat exchanger positioned in the chamber. The heat exchanger includes a heat exchanger body having a first terminal interface being thermally coupled to the first pad of the first terminal and a second terminal interface being thermally coupled to the second pad of the second terminal. The heat exchanger includes a coolant channel for coolant flow through the heat exchanger for actively cooling the first terminal and the second terminal. The heat exchanger includes a thermally conductive separator electrically isolating the heat exchanger from at least one of the first pad of the first terminal and the second pad of the second terminal.

In another embodiment, a power connector is provided including a housing extending between a front and a rear having a chamber at the rear and a terminal channel between the front and the rear. The power connector includes a terminal coupled to the housing including a mating pin at a front of the terminal and a cable connector at a rear of the terminal. The mating pin is positioned in the terminal channel for mating with a charging connector. The cable connector is positioned in the chamber at the rear of the housing including a pad configured to be terminated to a power cable. The power connector includes a heat exchanger positioned in the chamber. The heat exchanger is thermally coupled to the pad of the terminal. The heat exchanger includes a coolant channel for coolant flow through the heat exchanger for actively cooling the terminal. The heat exchanger including a heat exchanger body forming a cavity. The heat exchanger body has a terminal interface being thermally coupled to the cable connector of the terminal. The heat exchanger includes a diverter wall received in the cavity adjacent the terminal interface to reduce a size of the coolant channel at the terminal interface.

DETAILED DESCRIPTION OF THE INVENTION

Figure 1:
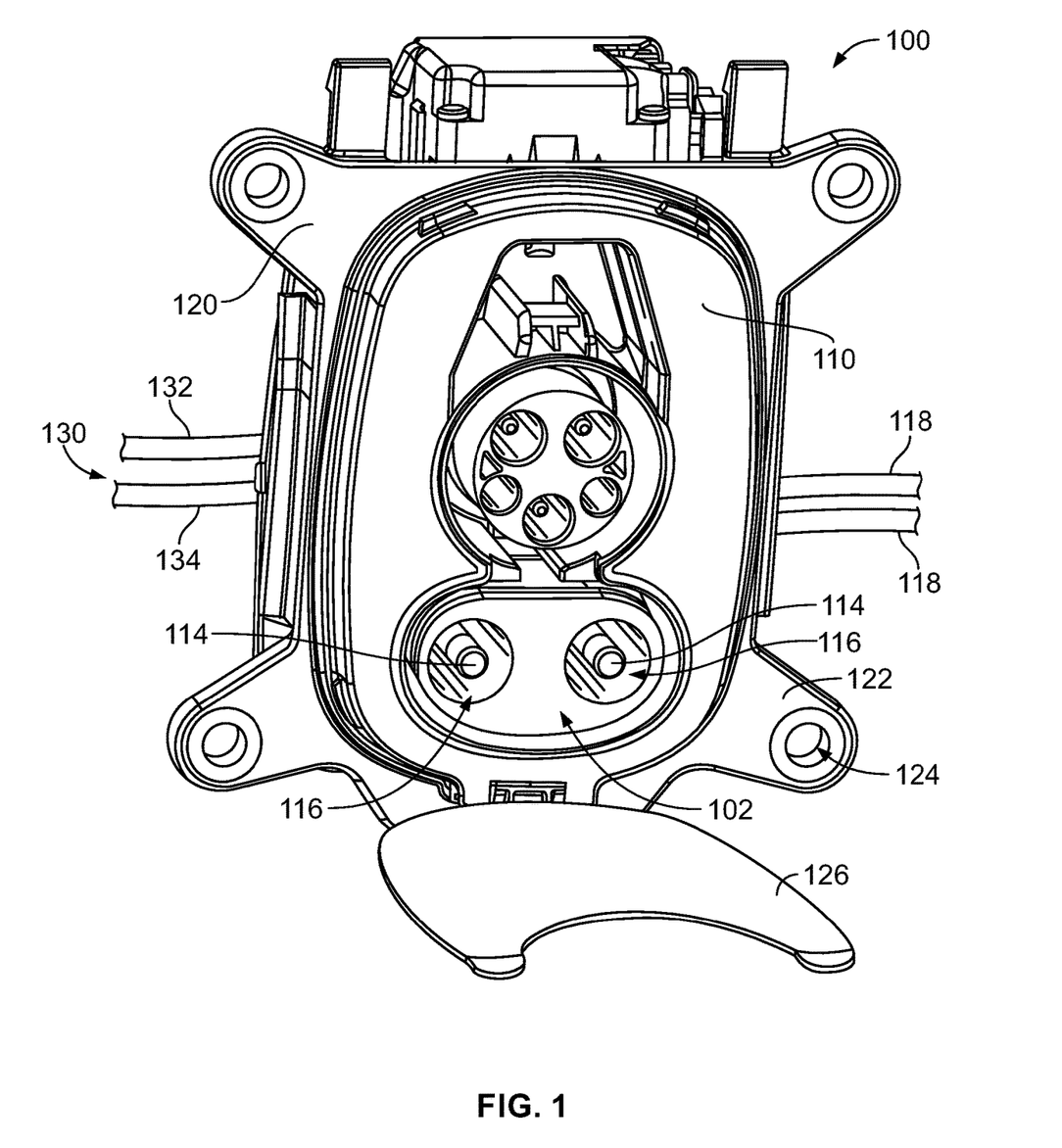
FIG. 1 is a front perspective view of a power connector of a charging inlet assembly having a cooling system for cooling components of the power connector in accordance with an exemplary embodiment.
Figure 2:
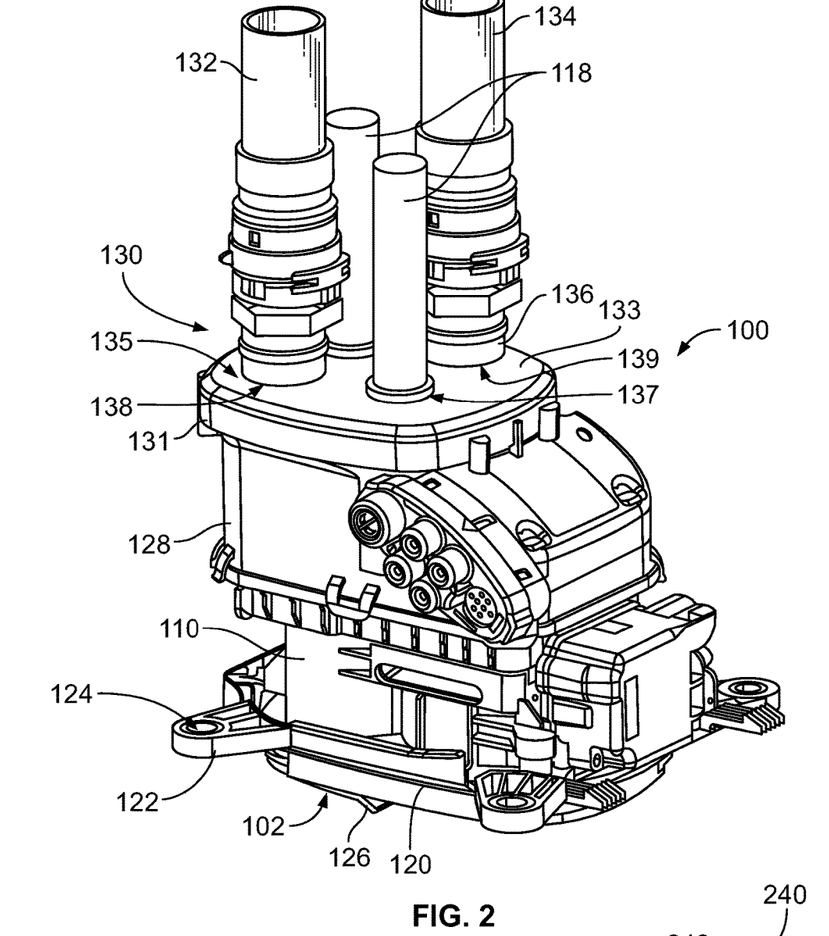
FIG. 2 is a rear perspective view of the charging inlet assembly and cooling system in accordance with an exemplary embodiment.

FIG. 1 is a front perspective view of a power connector 102 of a charging inlet assembly 100 having a cooling system 130 for cooling components of the power connector 102. FIG. 2 is a rear perspective view of the charging inlet assembly 100 and cooling system 130 in accordance with an exemplary embodiment. While the power connector 102 may be described herein as part of the charging inlet assembly 100, it is realized that the power connector 102 may be another type of electrical connector.

The charging inlet assembly 100 is used as a charging inlet for a vehicle, such as an electric vehicle (EV) or hybrid electric vehicle (HEV). The charging inlet assembly 100 includes a power connector 102 configured for mating reception with a charging connector (not shown). In an exemplary embodiment, the power connector 102 is configured for mating with a DC fast charging connector, such as the SAE combo CCS charging connector, in addition to AC charging connectors, such as the SAE J1772 charging connector.

The charging inlet assembly 100 includes a housing 110 holding terminals 114 forming part of the power connector 102. The terminals 114 are electrically connected to corresponding power cables 118. The terminals 114 are configured to be mated to the charging connector. The terminals 114 are received in terminal channels 116 and coupled to the housing 110 in the terminal channels 116. In an exemplary embodiment, the charging inlet assembly 100 includes the cooling system 130 for actively cooling the terminals 114. For example, coolant may be pumped through lines or channels of the cooling system 130 and flow in thermal communication with the terminals 114 to dissipate heat from the terminals 114.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a terminal cover 126 (FIG. 1) hingedly coupled to the mounting flange 120 and/or the housing 110. The terminal cover 126 is used to cover corresponding terminals 114. The housing 110 includes a rear cover 128 (FIG. 2) at a rear of the housing 110 that closes access to the rear of the housing 110. The rear cover 128 may be clipped onto the main part of the housing 110, such as using clips or latches. Other types of securing features, such as fasteners may be used in alternative embodiments.

In an exemplary embodiment, the cooling system 130 includes a cooling adapter 131 (FIG. 2) at the rear of the housing 110, such as coupled to the rear cover 128. A seal may be provided at the interface between the cooling adapter 131 and the main body of the housing 110 and/or between pieces of the cooling adapter 131. For example, the cooling adapter 131 may be a multi-piece adapter. The cooling adapter 131 includes an adapter body 133 forming a cavity 135. The adapter body 133 forms part of the housing 110 to enclose the rear chamber of the housing 110. The cavity 135 is open to the rear chamber of the housing 110. The cooling components of the cooling system 130 are thermally coupled to the terminals 114 in the cavity 135 and/or the rear chamber of the housing 110. The adapter body 133 includes cable exits 137 for the power cables 118. The cooling adapter 131 includes a supply port 138 and a return port 139. A coolant supply line 132 is coupled to the supply port 138. A coolant return line 134 is coupled to the return port 139. The cooling adapter 131 may include one or more interface seals 136 for interfacing with coolant supply and return lines 132, 134. In the illustrated embodiment, the supply port 138 and the return port 139 are arranged at the rear of the adapter body 133, such as adjacent the cable exits 137, such that the coolant supply line 132 and the coolant return line 134 extend from the rear (for example, parallel to the power cables 118). However, the ports 138, 139 may be at other locations. In an alternative embodiment, the supply port 138 and/or the return port 139 may be located on opposite sides of the adapter body 133.

Figure 3:
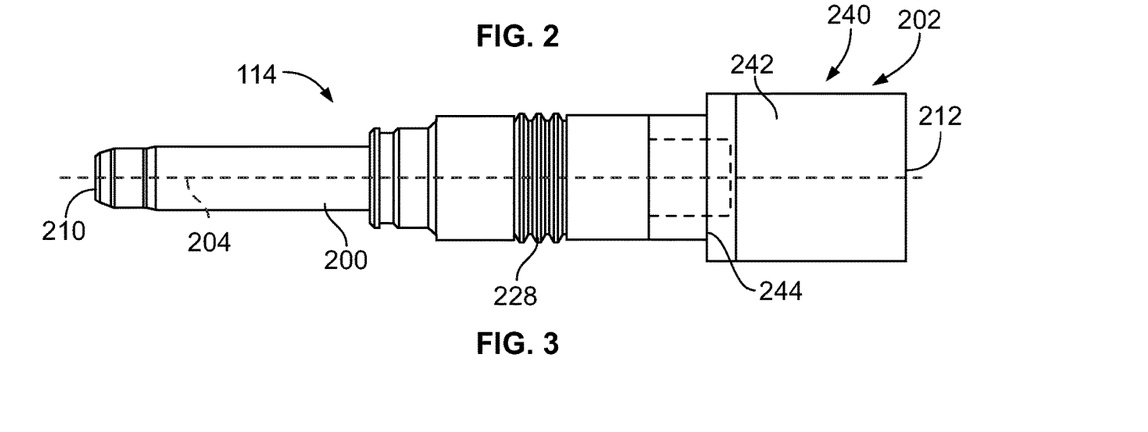
FIG. 3 is a side view of a terminal of the power connector in accordance with an exemplary embodiment.

FIG. 3 is a side view of the terminal 114 in accordance with an exemplary embodiment. The terminal 114 includes a mating pin 200 at a front 210 of the terminal 114 and a cable connector 202 at a rear 212 of the terminal 114. The terminal 114 extends along a longitudinal axis 204. The mating pin 200 is configured to be mated to the charging connector. The cable connector 202 is configured to be electrically connected to the power cable 118 (shown in FIG. 2). In an exemplary embodiment, the mating pin 200 and/or the cable connector 202 are configured to be cooled by the cooling system 130 (shown in FIG. 2).

In various embodiments, the cable connector 202 is separate and discrete from the mating pin 200 and configured to be mechanically and electrically coupled to the mating pin 200. For example, the cable connector 202 may be press fit onto the mating pin 200. However, the cable connector 202 may be secured to the mating pin 200 by other processes in alternative embodiments, such as welding, riveting, a bolted joint, and the like. In other various embodiments, the cable connector 202 is integral with the mating pin 200, such as formed with the mating pin 200. In various embodiments, the cable connector 202 is configured to be terminated to the power cable 118 by welding the power cable 118 to the cable connector 202. For example, the cable connector 202 may include a weld tab. In other various embodiments, the cable connector 202 is terminated to the power cable 118 by other processes, such as being crimped, soldered, and the like. For example, the cable connector 202 may include a crimp barrel configured to be terminated to the power cable 118.

The mating pin 200 is electrically conductive. For example, the mating pin 200 may be manufactured from a metal material, such as a copper material. In an exemplary embodiment, the mating pin 200 is screw machined. The mating pin 200 may be manufactured from a metal alloy (for example, copper alloy) having additives to increase machinability. In an exemplary embodiment, the mating pin 200 is cylindrical. In an exemplary embodiment, a seal 228 is coupled to the mating pin 200 near a rear end of the mating pin 200 for interface sealing against an interior surface of the terminal channel 116 (shown in FIG. 1).

The cable connector 202 extends from and/or is coupled to the rear end of the mating pin 200. The cable connector 202 may be press-fit on the mating pin 200. The cable connector 202 includes a cable terminating end 240 at the rear 212 of the terminal 114. The power cable 118 is configured to be terminated to the cable terminating end 240. In the illustrated embodiment, the cable connector 202 includes a pad 242 extending from a base 244 of the cable connector 202. The pad 242 is provided at the rear 212. The pad 242 may be rectangular or have other shapes in alternative embodiments. The pad 242 may include planar, parallel surfaces for attaching the power cable 118 to the pad 242. In various embodiments, the pad 242 may be a weld pad and the power cable 118 may be a welded to the weld pad. The cable terminating end 240 may include a crimp barrel (not shown) rather than the pad 242 in alternative embodiments. The base 244 may be cylindrical and hollow receiving the rear end of the mating pin 200. The base 244 is mechanically and electrically coupled to the rear end of the mating pin 200. The base 244 may be press-fit onto the rear end of the mating pin 200.

Figure 4:
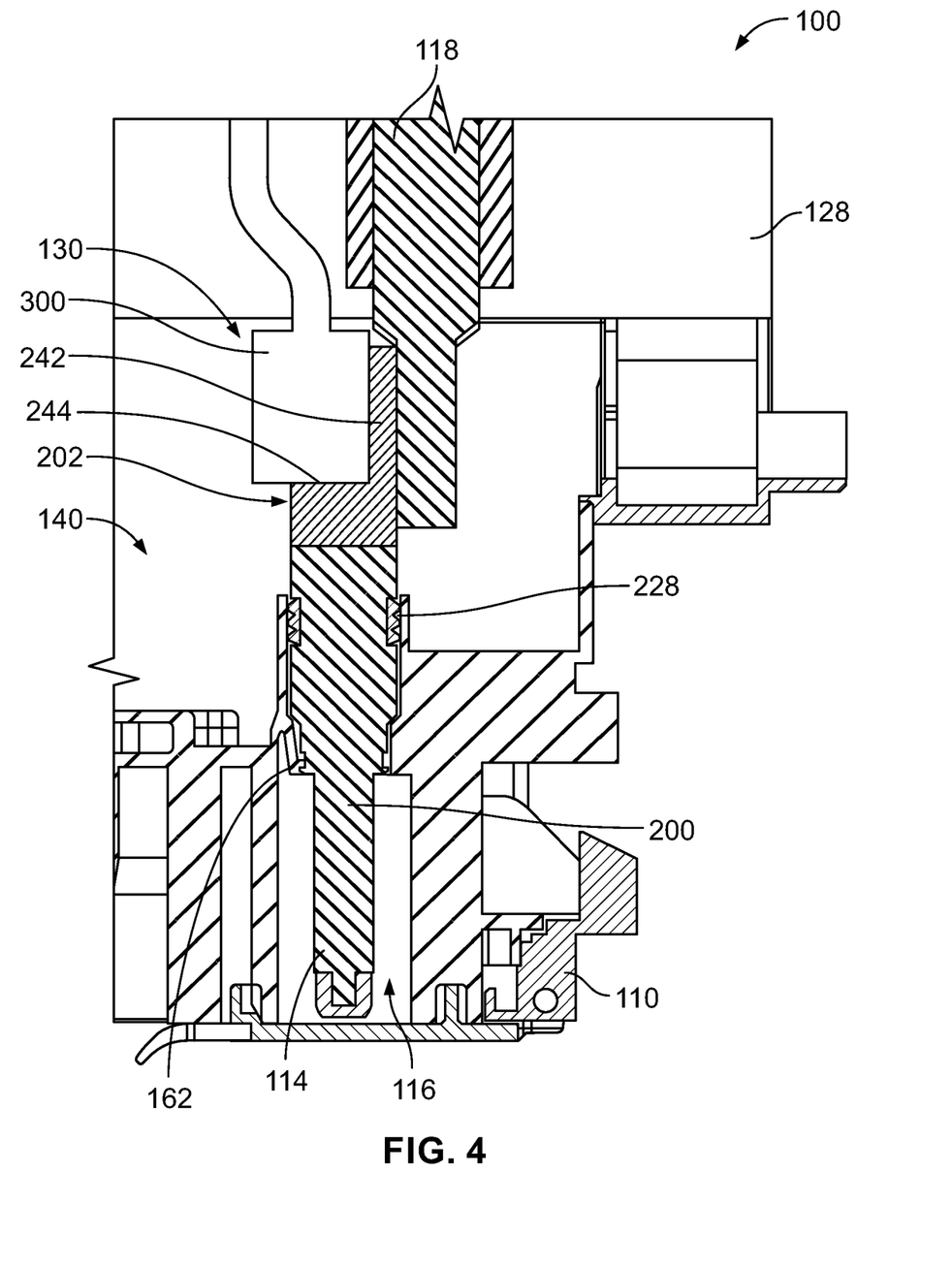
FIG. 4 is a cross-sectional view of the charging inlet assembly in accordance with an exemplary embodiment.

FIG. 4 is a cross-sectional view of the charging inlet assembly 100 in accordance with an exemplary embodiment. FIG. 4 illustrates one of the terminals 114 coupled to the housing 110. The housing 110 has a chamber 140 at the rear of the housing 110. The rear cover 128 is rearward of and closes the chamber 140. The rear cover 128 may include cable exits (for example, openings) that receive the power cables 118 and allow the power cables 118 to exit the chamber 140. The rear cover 128 may include coolant line exits (for example, openings) or ports that allow supply and return of the coolant of the cooling system 130 for actively cooling the terminal 114.

The terminal 114 extends into the chamber 140 and the power cable 118 is terminated to the terminal 114 in the chamber 140. The cooling system 130 interfaces with the power cable 118 in the chamber 140 to provide active cooling for the terminal 114. For example, the cooling system 130 includes a heat exchanger 300 positioned in the chamber 140 to interface with the terminal 114. The heat exchanger 300 is thermally coupled to the terminal 114. The cooling system 130 lowers the operating temperature of the terminal 114 to improve performance of the charging inlet assembly 100 and/or to allow higher current through the terminal 114 and/or to reduce risk of damage to the terminal 114.

The terminal 114 is received in the corresponding terminal channel 116. The mating pin 200 is located in the terminal channel 116 for interfacing with a charging connector plugged into the housing 110. The housing 110 includes a primary latch 162 extending into the terminal channel 116 to engage and axially retain the terminal 114 in the terminal channel 116. The primary latch 162 may be a deflectable latch. The primary latch 162 may be integral with the housing 110, such as co-molded with the housing 110. The primary latch 162 resists rearward pull out of the terminal 114 from the terminal channel 116. In an exemplary embodiment, the seal 228 is sealed to a surface of the housing 110 defining the terminal channel 116.

In an exemplary embodiment, the terminal 114 is located in the terminal channel 116 such that the cable connector 202 is located immediately rearward of the terminal channel 116. The cable connector 202 extends into the chamber 140 for electrical connection with the power cable 118. The power cable 118 is coupled to the pad 242 within the chamber 140. In an exemplary embodiment, the power cable 118 may be ultrasonically welded to the pad 242, creating a low resistance interface between the terminal 114 and the power cable 118. In other various embodiments, the power cable 118 may be crimped or otherwise mechanically and electrically terminated to the terminal 114. The cooling system 130 is thermally coupled to the terminal 114 immediately rearward of the terminal channel 116 to define a low-profile connection between the cooling system 130 and the terminal 114. In various embodiments, the heat exchanger 300 may be directly thermally coupled to the base 244 and/or the pad 242. In other various embodiments, the heat exchanger 300 may be indirectly thermally coupled to the terminal 114, such as through a thermal interface material, a thermal grease or another thermal bridge.

Figure 5:
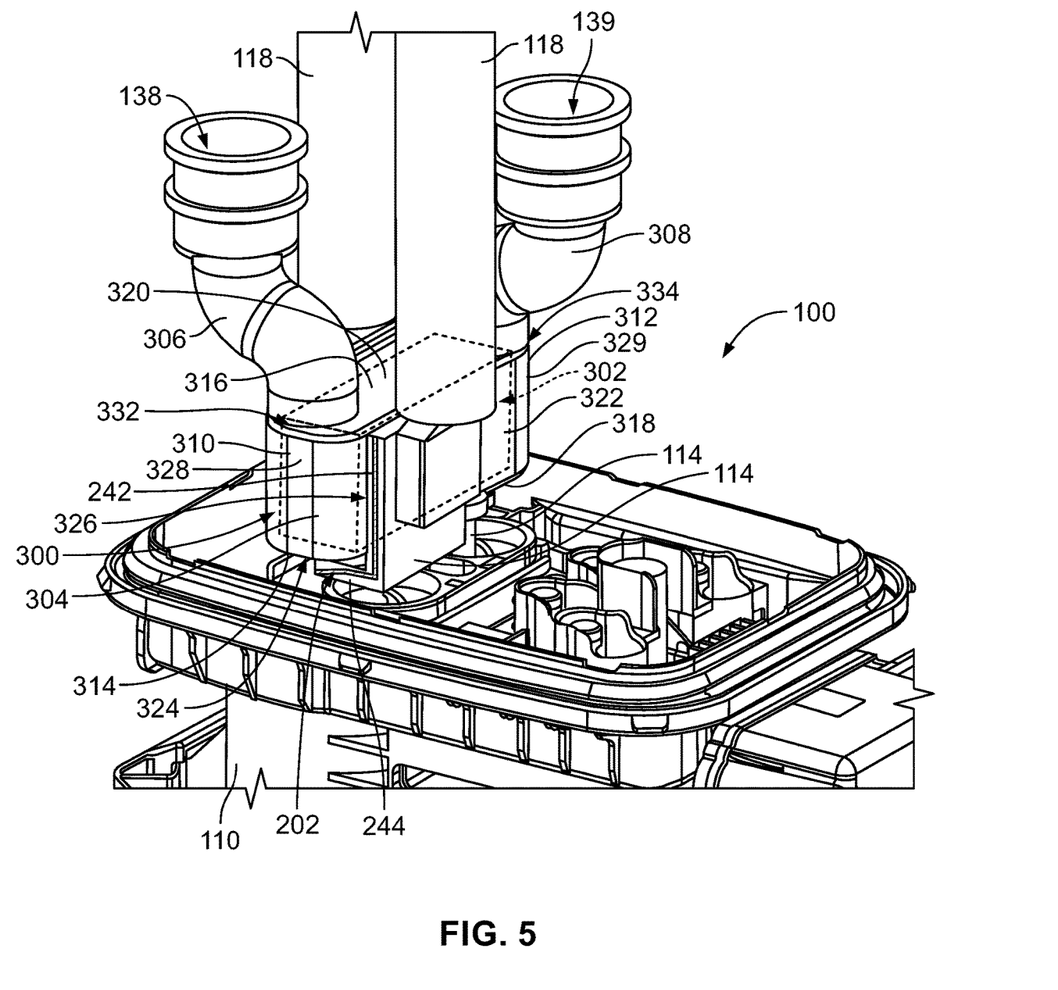
FIG. 5 is a rear perspective view of a portion of the charging inlet assembly in accordance with an exemplary embodiment.

FIG. 5 is a rear perspective view of a portion of the charging inlet assembly 100 in accordance with an exemplary embodiment. FIG. 5 illustrates the pair of power cables 118 terminated to the pair of terminals 114. FIG. 5 illustrates a portion of the cooling adapter 131 showing the heat exchanger 300 thermally coupled to the terminals 114. The heat exchanger 300 is configured to be coupled to the coolant supply line 132 and the coolant return line 134 (both shown in FIG. 2) at the supply port 138 and the return port 139, respectively. The heat exchanger 300 includes a coolant channel 302 through the heat exchanger 300. Coolant flows through the coolant channel 302 to transfer heat from the heat exchanger 300. The heat exchanger 300 is configured to be thermally coupled to the pads 242 of the terminals 114. In various embodiments, a support frame 400 (shown in FIG. 9) surrounds the heat exchanger 300 and the pads 242 of the terminals 114. The support frame 400 engages the heat exchanger 300 and/or the pads 242 to press the heat exchanger 300 against the pads 242. The support frame 400 may include fasteners, clips, latches or other securing features.

The heat exchanger 300 includes a heat exchanger body 304 defining the coolant channel 302. The heat exchanger 300 includes a supply tube 306 and a return tube 308 extending from the heat exchanger body 304. The supply tube 306 extends to the supply port 138. The return tube 308 extends to the return port 139. In an exemplary embodiment, the terminals 114 are received in the housing 110 such that the pads 242 face in opposite directions. For example, the pads 242 are oriented 180° relative to each other. The heat exchanger 300 is positioned between the pads 242.

The heat exchanger body 304 extends between a supply side 310 and a return side 312. The heat exchanger body 304 includes a front 314 and a rear 316. The heat exchanger body 304 includes an end wall 318 at the front 314. In an exemplary embodiment, the heat exchanger 300 includes a heat exchanger lid 320 coupled to the rear 316 of the heat exchanger body 304. The heat exchanger body 304 and the heat exchanger lid 320 may be manufactured from thermally conductive materials, such as metal materials. Optionally, both the heat exchanger body 304 and the heat exchanger lid 320 are manufactured form the same material. In various embodiments, the heat exchanger body 304 and/or the heat exchanger lid 320 are manufactured from aluminum or an aluminum alloy. The heat exchanger body 304 and the heat exchanger lid 320 may be stamped and formed. However, the heat exchanger body 304 and the heat exchanger lid 320 may be manufactured by other processes in alternative embodiments, such as being molded, machined, and the like.

The heat exchanger body 304 includes a side wall 322 extending between the front 314 and the rear 316. The side wall 322 extends between the end wall 318 and the heat exchanger lid 320. In an exemplary embodiment, the end wall 318 is thermally coupled to the bases 244 of the cable connectors 202 of the terminals 114 at base thermal interfaces 324. The side wall 322 is thermally coupled to the pads 242 of the cable connectors 202 of the terminals 114 at pad thermal interfaces 326. In an exemplary embodiment, the pad thermal interfaces 326 are provided at a first side 328 and a second side 329 of the heat exchanger body 304. The base thermal interfaces 324 and the pad thermal interfaces 326 are adjacent the terminals 114.

The heat exchanger body 304 defines a space or cavity forming the coolant channel 302. For example, the side wall 322 and the end wall 318 form the cavity. The heat exchanger lid 320 is coupled to the heat exchanger body 304 to close the heat exchanger body 304. In an exemplary embodiment, the heat exchanger lid 320 may be separate and discrete from the heat exchanger body 304. In an exemplary embodiment, the heat exchanger lid 320 is brazed to the heat exchanger body 304. However, the heat exchanger lid 320 may be coupled to the heat exchanger body 304 by other processes. In alternative embodiments, the heat exchanger body 304 includes a rear end wall rather than a separate heat exchanger lid. The supply tube 306 and the return tube 308 extend from the heat exchanger lid 320. In an exemplary embodiment, the supply tube 306 and the return tube 308 are brazed to the heat exchanger lid 320. However, the supply tube 306 and the return tube 308 may be coupled to the heat exchanger lid 320 by other processes.

The coolant channel 302 is configured for flow communication with the supply tube 306 and the return tube 308 and the supply and return coolant lines 132, 134. The coolant is routed through the coolant channel 302 to dissipate heat from the heat exchanger body 304 of the heat exchanger 300 for cooling the terminal 114. The coolant channel 302 may extend along a non-linear path, such as a curved or serpentine path in alternative embodiments. The coolant channel 302 extends between an inlet 332 at the supply side 310 and an outlet 334 at the return side 312. The supply tube 306 is coupled to the inlet 332 and the return tube 308 is coupled to the outlet 334. In an exemplary embodiment, the supply tube 306 and the return tube 308 have offset bends to position the supply port 138 and the return port 139 relative to the inlet 332 and the outlet 334. In an exemplary embodiment, the supply and return tubes 306, 308 have first and second bends to transition the tubes 306, 308 away from the heat exchanger body 304. The coolant flow direction through the supply port 138 and/or the return port 139 are parallel and straight into/out of the heat exchanger body 304. The coolant flow direction through the inlet 332 and/or the outlet 334 are parallel to the power cables 118 (for example, straight flow path to/from the coolant supply line 132 and the coolant return line 134). The supply tube 306 transitions away from the pad 242. The return tube 308 transitions away from the pad 242.

Figure 6:
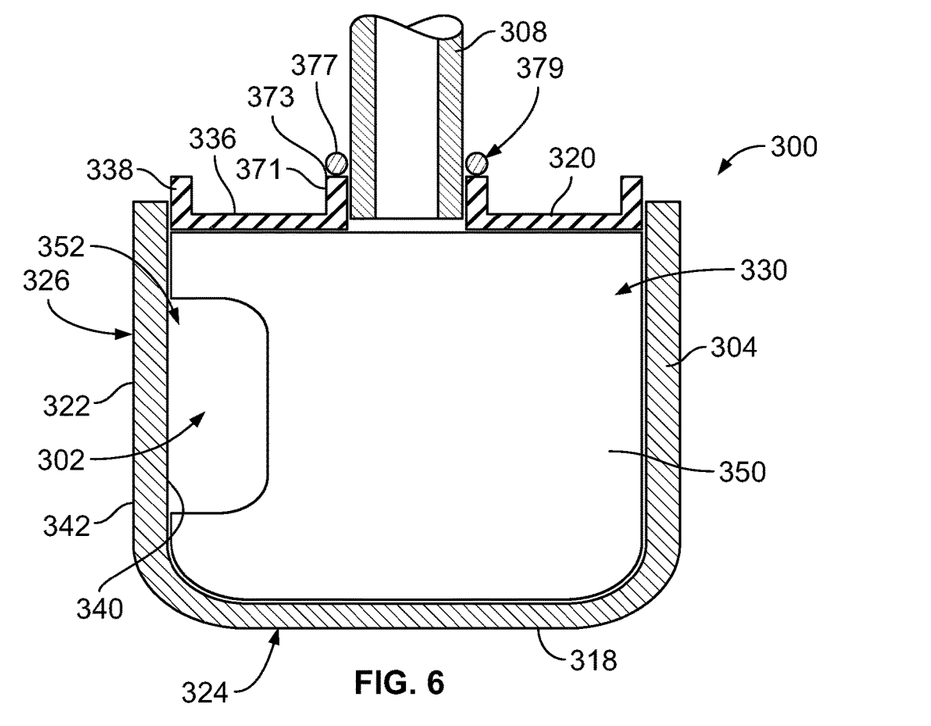
FIG. 6 is a cross sectional view of a heat exchanger of the cooling system in accordance with an exemplary embodiment.

FIG. 6 is a cross sectional view of the heat exchanger 300 in accordance with an exemplary embodiment. FIG. 6 shows the heat exchanger lid 320 coupled to the heat exchanger body 304 to enclose a cavity 330. For example, the cavity 330 is defined by the end wall 318 and the side wall 322 and closed by the heat exchanger lid 320 opposite the end wall 318. In an exemplary embodiment, the heat exchanger lid 320 includes an end wall 336 and a side wall 338 extending from the end wall 336. The end wall 336 of the heat exchanger lid 320 is received in the cavity 330 such that the side wall 338 of the heat exchanger lid 320 engages an interior surface 340 of the side wall 322 of the heat exchanger body 304. In alternative embodiments, the side wall 338 of the heat exchanger lid 320 engages an exterior surface 342 of the side wall 322 of the heat exchanger body 304. In an exemplary embodiment, the side wall 338 of the heat exchanger lid 320 is brazed to the side wall 322 of the heat exchanger body 304. However, the heat exchanger lid 320 may be coupled to the heat exchanger body 304 by other processes in alternative embodiments.

In an exemplary embodiment, the heat exchanger lid 320 includes a rim 371 around the outlet 334 that receives the return tube 308. The rim 371 extends to an outlet ledge 373 at the outer edge of the rim 371. The rim 371 abuts against the return tube 308 for joining the supply tube 306 to the heat exchanger lid 320. The rim 371 and/or the return tube 308 may include locating features, such as a dimple, a divot, a tab, and the like for locating the return tube 308 relative to the rim 371. The inlet ledge 373 receives a braze wire 377 configured to be brazed to the heat exchanger lid 320 and the return tube 308 to form an outlet braze joint 379 between the heat exchanger lid 320 and the return tube 308. The braze wire 377 flows into the gap between the close-fitting heat exchanger lid 320 and the return tube 308 by capillary action. The outlet braze joint 379 defines a fillet at the interface between the heat exchanger lid 320 and the return tube 308. The heat exchanger lid 320 and the return tube 308 may be joined by other joining processes, such as soldering, welding, using fasteners, using fluid couplers, and the like.

In an exemplary embodiment, the heat exchanger 300 includes a diverter wall 350 received in the cavity 330. The diverter wall 350 forms the coolant channel 302 to control the flow of coolant through the cavity 330. In an exemplary embodiment, the diverter wall 350 includes one or more openings 352 therethrough to control fluid flow through the cavity 330. The openings 352 may be aligned with the base thermal interface 324 and/or the pad thermal interface 326 to promote fluid flow across the interior surface of the end wall 318 and/or the side wall 322. The diverter wall 350 is positioned in the cavity 330 adjacent the terminal interfaces 324, 326 to reduce a size of the coolant channel 302 at the terminal interfaces 324, 326.

In the illustrated embodiment, the diverter wall 350 extends between the end wall 318 of the heat exchanger body 304 and the end wall 336 of the heat exchanger lid 320. In various embodiments, the diverter wall 350 extends the entire height between the end wall 318 and the end wall 336. In other various embodiments, the diverter wall 350 extends partially between the end wall 318 and the end wall 336. The diverter wall 350 may be vertically oriented in various embodiments; however, the diverter wall 350 may have other orientations in alternative embodiments. Optionally, the heat exchanger 300 may include multiple diverter walls 350 oriented in various orientations to control fluid flow through the cavity 330. In an exemplary embodiment, the diverter wall 350 supports the heat exchanger lid 320 across the cavity 330 relative to the heat exchanger body 304. The diverter wall 350 may be coupled to the heat exchanger lid 320 and/or the end wall 318 and/or the side wall 322.

Figure 7:
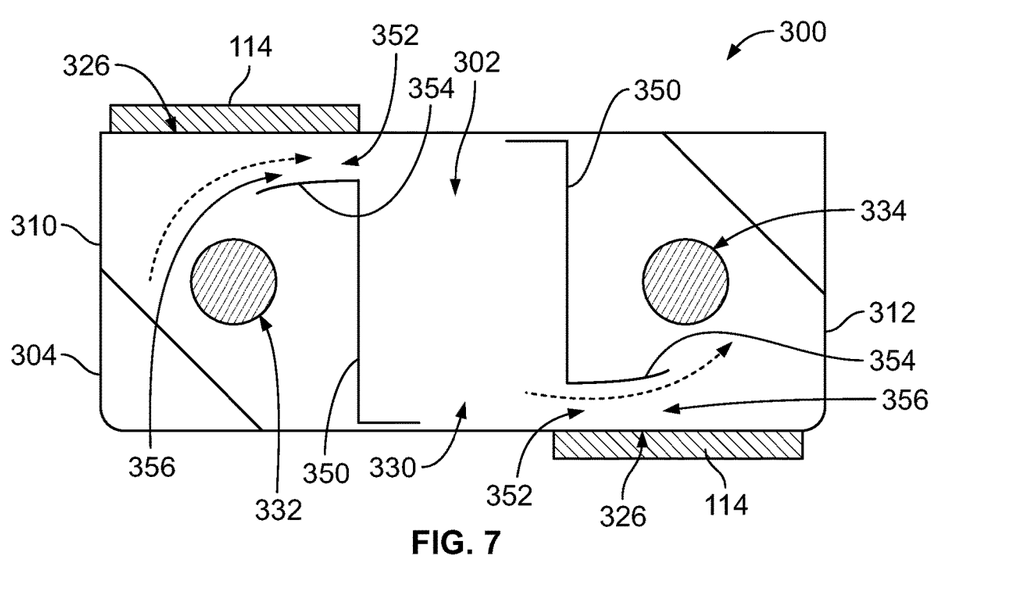
FIG. 7 is a cross sectional view of the heat exchanger in accordance with an exemplary embodiment.

FIG. 7 is a cross sectional view of the heat exchanger 300 in accordance with an exemplary embodiment. FIG. 7 shows the coolant channel 302 extending between the inlet 332 at the supply side 310 and the outlet 334 at the return side 312 of the heat exchanger body 304. FIG. 7 shows diverter walls 350 in the cavity 330 to define the coolant channel 302 through the heat exchanger 300. The openings 352 are located proximate to the thermal interfaces 326. In an exemplary embodiment, the diverter walls 350 include tabs 354 at the openings 352. The tabs 354 are bent out of plane from the diverter walls 350 to form diverter channels 356 through the openings 352. The diverter channels 356 form portions of the coolant channel 302. The diverter channels 356 have a reduced area (for example, narrower) compared to other areas of the coolant channel 302 to increase fluid flow through the diverter channels 356. The diverter channels 356 are aligned with the thermal interfaces 326 to increase fluid flow adjacent the thermal interfaces 326 and increase heat exchange between the terminals 114 and the heat exchanger 300 for enhanced cooling of the terminals 114. The diverter walls 350 deflect the coolant within the cavity 330 to improve impingement of the cooling fluid along the heat transfer surface.

Figure 8:
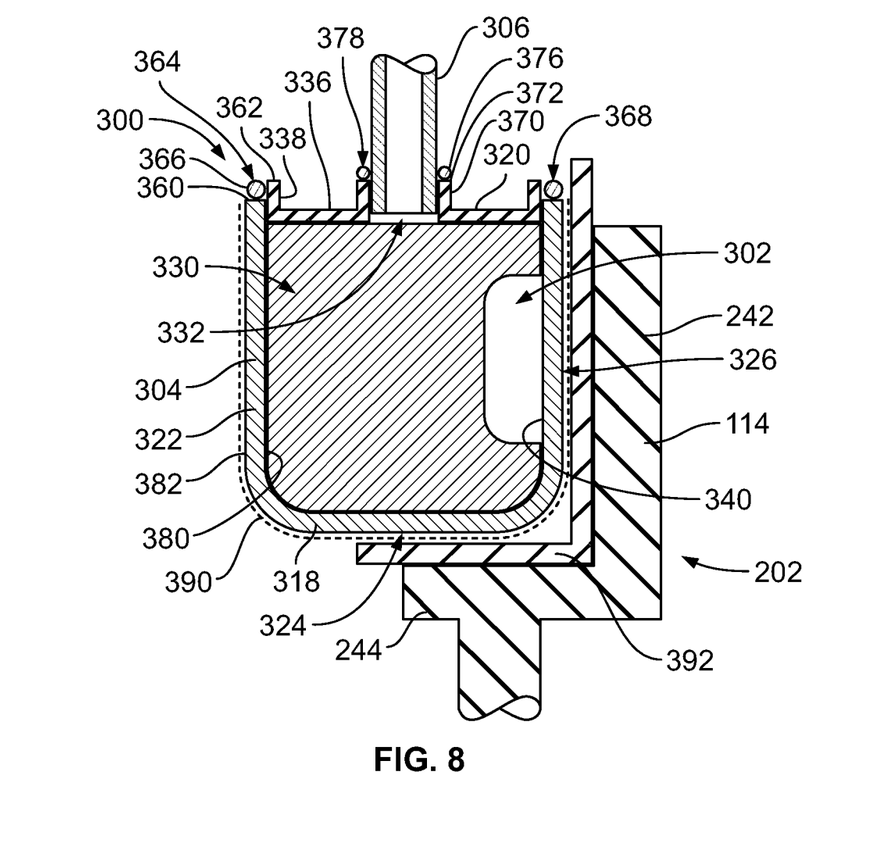
FIG. 8 is a cross sectional view of the heat exchanger coupled to the terminal in accordance with an exemplary embodiment.

FIG. 8 is a cross sectional view of the heat exchanger 300 coupled to the terminal 114 in accordance with an exemplary embodiment. FIG. 8 FIG. 8 shows the supply tube 306 coupled to the heat exchanger lid 320. In an exemplary embodiment, the heat exchanger lid 320 is cup shaped, such as being a drawn cup, that is nested in the cavity of the heat exchanger body 304. For example, the side wall 338 extends upward from the end wall 336 to form the cup. The side wall 338 of the heat exchanger lid 320 is positioned in the cavity 330 such that the side wall 338 engages the interior surface 340 of the side wall 322 of the heat exchanger body 304.

In an exemplary embodiment, the side wall 338 of the heat exchanger lid 320 extends to an outer edge 360 extending around the perimeter of the heat exchanger lid 320. The side wall 322 of the heat exchanger body 304 extends to an outer edge 362 extending around the perimeter of the heat exchanger body 304. The outer edge 360 is positioned adjacent the outer edge 362 for joining the heat exchanger lid 320 to the heat exchanger body 304. In an exemplary embodiment, the outer edge 360 is elevated slightly above the outer edge 362 to form a ledge 364. Alternatively, the outer edge 362 may be elevated slightly above the outer edge 360 to form an interior ledge rather than the exterior ledge 364. The ledge 364 receives a braze wire 366 configured to be brazed to the heat exchanger lid 320 and the heat exchanger body 304 to form a braze joint 368 between the heat exchanger lid 320 and the heat exchanger body 304. The braze wire 366 flows into the gap between the close-fitting heat exchanger lid 320 and the heat exchanger body 304 by capillary action. The braze joint 368 defines a fillet at the interface between the heat exchanger lid 320 and the heat exchanger body 304. The heat exchanger lid 320 and the heat exchanger body 304 may be joined by other joining processes, such as soldering, welding, using fasteners, and the like.

In an exemplary embodiment, the heat exchanger lid 320 includes a rim 370 around the inlet 332 (and the outlet 334 (not shown)) that receives the supply tube 306. The rim 370 extends to an inlet ledge 372 at the outer edge of the rim 370. The rim 370 abuts against the supply tube 306 for joining the supply tube 306 to the heat exchanger lid 320. The rim 370 and/or the supply tube 306 may include locating features, such as a dimple, a divot, a tab, and the like for locating the supply tube 306 relative to the rim 370. The inlet ledge 372 receives a braze wire 376 configured to be brazed to the heat exchanger lid 320 and the supply tube 306 to form an inlet braze joint 378 between the heat exchanger lid 320 and the supply tube 306. The braze wire 376 flows into the gap between the close-fitting heat exchanger lid 320 and the supply tube 306 by capillary action. The inlet braze joint 378 defines a fillet at the interface between the heat exchanger lid 320 and the supply tube 306. The heat exchanger lid 320 and the supply tube 306 may be joined by other joining processes, such as soldering, welding, using fasteners, using fluid couplers, and the like. In an exemplary embodiment, the heat exchanger lid 320 is joined to the return tube 308 (shown in FIG. 5) by a similar process to form a return braze joint.

The heat exchanger 300 is thermally coupled to the terminal 114, such as at the base 244 and the pad 242. For example, the end wall 318 faces and is thermally coupled to the base 244 at the base thermal interface 324 and the side wall 322 faces and is thermally coupled to the pad 242 at the pad thermal interface 326. In various embodiments, the cable connector 202 is L-shaped with the pad 242 oriented perpendicular to the base 244. The side wall 322 may be oriented perpendicular to the end wall 318 for interfacing with the pad 242 and the base 244.

The heat exchanger body 304 has an inner surface 380 and an outer surface 382. The inner surface 380 forms the cavity 330 defining the coolant channel 302. In an exemplary embodiment, the heat exchanger 300 includes an electrical isolating coating 390 applied to the outer surface 382. Optionally, the entire outer surface 382 may be covered with the electrical isolating coating 390. In other various embodiments, selective portions of the outer surface 382 are covered by the electrical isolating coating 390, such as at the terminal interfaces 324, 326 facing the cable connector 202 of the terminal 114. The electrical isolating coating 390 may be a thin layer on the outer surface 382. In an exemplary embodiment, the electrical isolating coating 390 is manufactured from an electrically insulative material. The electrical isolating coating 390 may be manufactured from a thermally conductive material. In various embodiments, the electrical isolating coating 390 is an electrostatic power coating layer. In other various embodiments, the electrical isolating coating 390 is a tape or film applied to the outer surface 382.

In an exemplary embodiment, the heat exchanger 300 includes a thermally conductive separator 392 electrically isolating the heat exchanger 300 from the terminal 114. In various embodiments, the thermally conductive separator 392 is coupled to the base 244 and/or the pad 242. In other various embodiments, the thermally conductive separator 392 is coupled to the end wall 318 and/or the side wall 322. The thermally conductive separator 392 is positioned between the terminal interfaces 324, 326 and the terminal 114. The thermally conductive separator 392 may be a thermal gasket. The thermally conductive separator 392 may be a silicone tape or film coupled to the terminal 114. In various embodiments, the thermally conductive separator 392 is overmolded thermally conductive separator 392 may be a thin layer on the outer surface 382. The thermally conductive separator 392 may be manufactured from a material that is electrically insulative and highly thermally conductive. The thermally conductive separator 392 may be a thermally conductive epoxy, a thermoplastic material or a thermoset material. The thermally conductive separator 392 may be manufactured from beryllium oxide, aluminum oxide, aluminum nitride, boron nitride, silicone, ceramic, Kapton, nylon, polyester, and the like. The thermally conductive separator 392 may be a pre-formed structure, such as a film, a pad, a sheet, a tube, an injection molded piece, and the like. In other various embodiments, the thermally conductive separator 392 may be applied in situ, such as an overmolded body, a grease or a paste applied to the terminal 114 or the heat exchanger body 304, and the like. In various embodiments, the thermally conductive separator 392 may be a heat shrink tube applied to the terminal 114. The thermally conductive separator 392 may be manufactured from a doped polymer material, such as a plastic material having thermally conductive materials added to the plastic material to increase the thermal conductivity. Other types of thermally conductive, electrically isolating material may be used in alternative embodiments.

In various embodiments, the thermally conductive separator 392 extends for a length beyond the base 244 and/or extends for a length beyond the pad 242 to provide increased creed distance between the terminal 114 and the heat exchanger 300. The electrical isolating coating 390 and the thermally conductive separator 392 provide double electrical isolation layers between the terminal 114 and the heat exchanger body 304. The heat exchanger body 304 is thermally coupled to the terminal 114 through the electrical isolating coating 390 and the thermally conductive separator 392.

Figure 9:
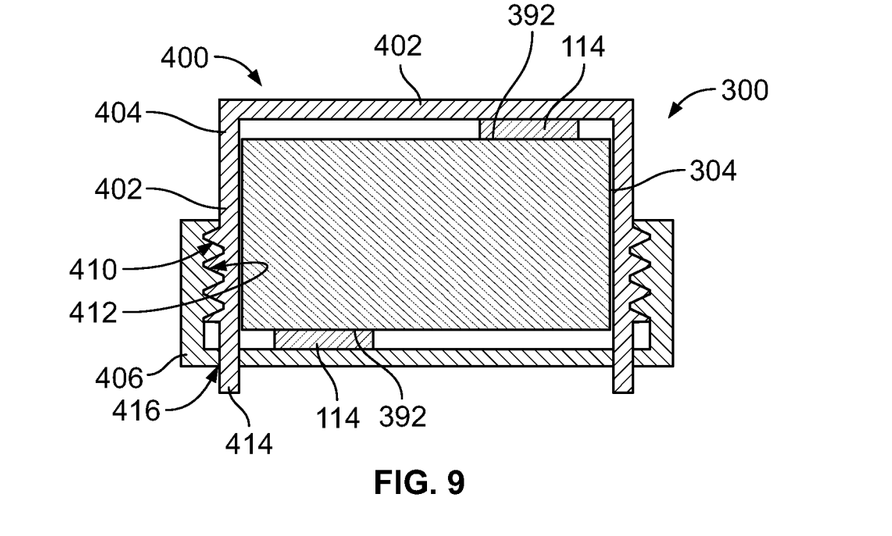
FIG. 9 is a top view of a portion of the charging inlet assembly showing a support frame for the heat exchanger.

FIG. 9 is a top view of a portion of the charging inlet assembly 100 showing the support frame 400 coupled to the heat exchanger 300 and the terminals 114. The support frame 400 is used to compress the thermal interfaces between the heat exchanger 300, the thermally conductive separators 392, and the terminals 114. The support frame 400 includes support arms 402 engaging the terminals 114 and/or the heat exchanger 300. The support frame 400 includes a first frame member 404 and a second frame member 406 secured using frame fasteners 410, 412. In the illustrated embodiment, the frame fasteners 410, 412 are ratchet style latches. Other types of frame fasteners 410, 412 may be used in alternative embodiments. As the first and second frame members 404, 406 are secured together, the support arms 402 compress against the terminals 114 and/or the heat exchanger body 304. In other various embodiments, the support frame 400 may include a single frame member wrapped entirely around the heat exchanger 300 and the terminals 114, such as being secured to itself.

In an exemplary embodiment, the first frame member 404 includes a latching tab 414 extending from an end of the first frame member 404. The second frame member 406 includes a latching opening 416 receiving the latching tab 414 and preventing lift off or separation of the frame fasteners 410, 412. Other types of latches and securing features may be used in alternative embodiments.

Figure 10:
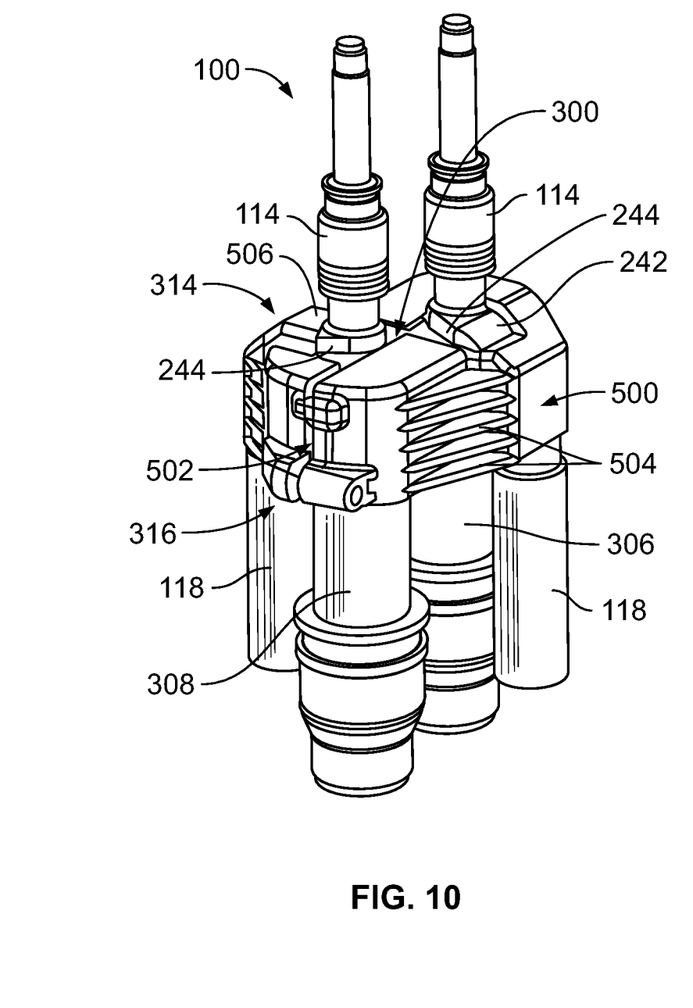
FIG. 10 is a front perspective view of a portion of the charging inlet assembly in accordance with an exemplary embodiment showing an outer housing.
Figure 11:
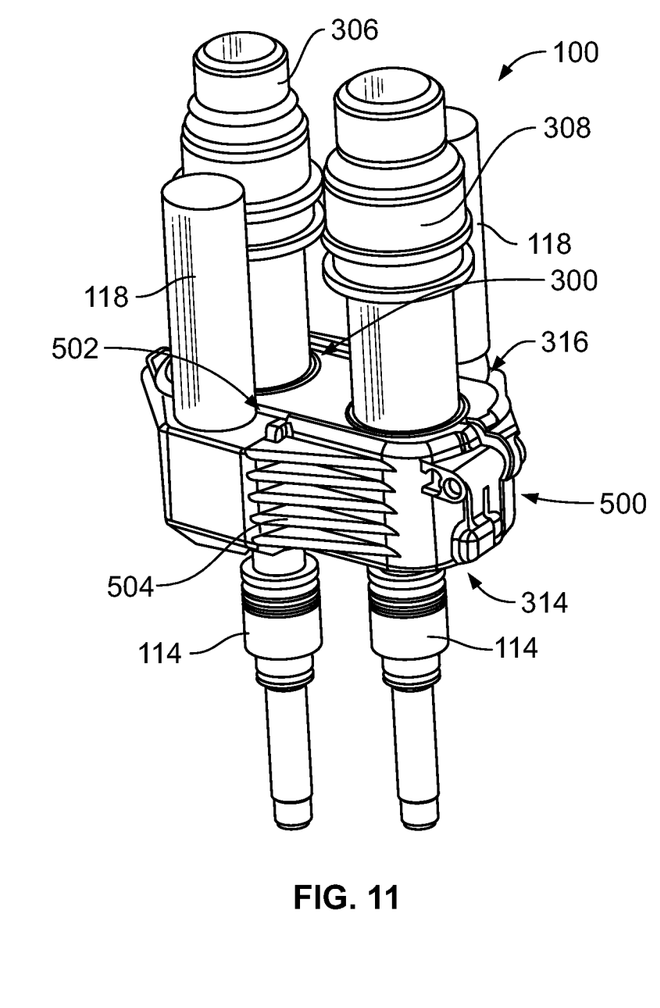
FIG. 11 is a rear perspective view of a portion of the charging inlet assembly in accordance with an exemplary embodiment showing the outer housing.
Figure 12:
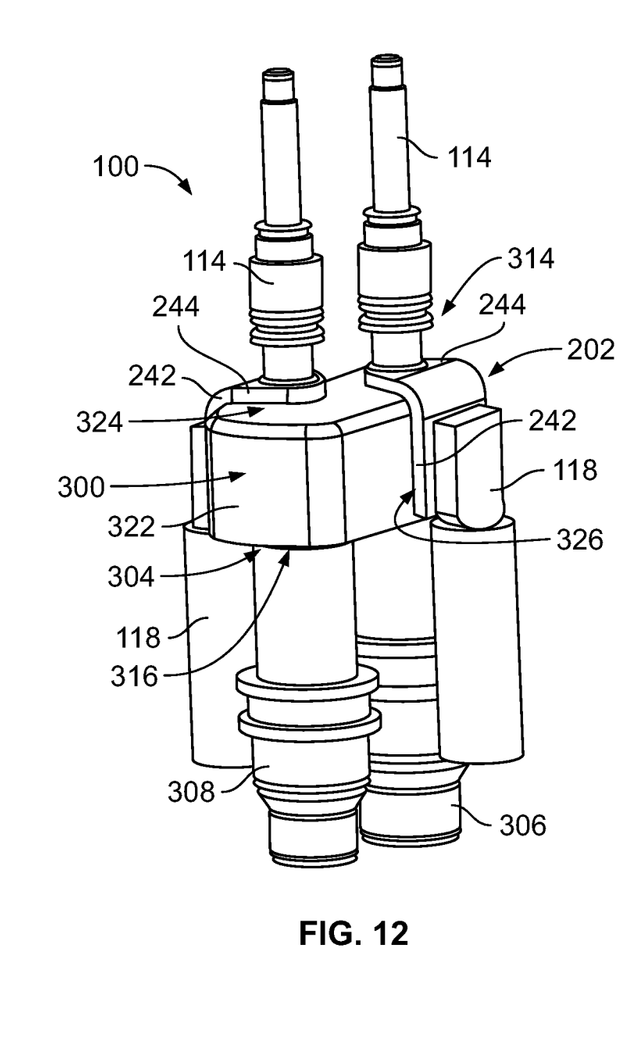
FIG. 12 is a front perspective view of a portion of the charging inlet assembly in accordance with an exemplary embodiment with the outer housing removed to illustrate the heat exchanger.
Figure 13:
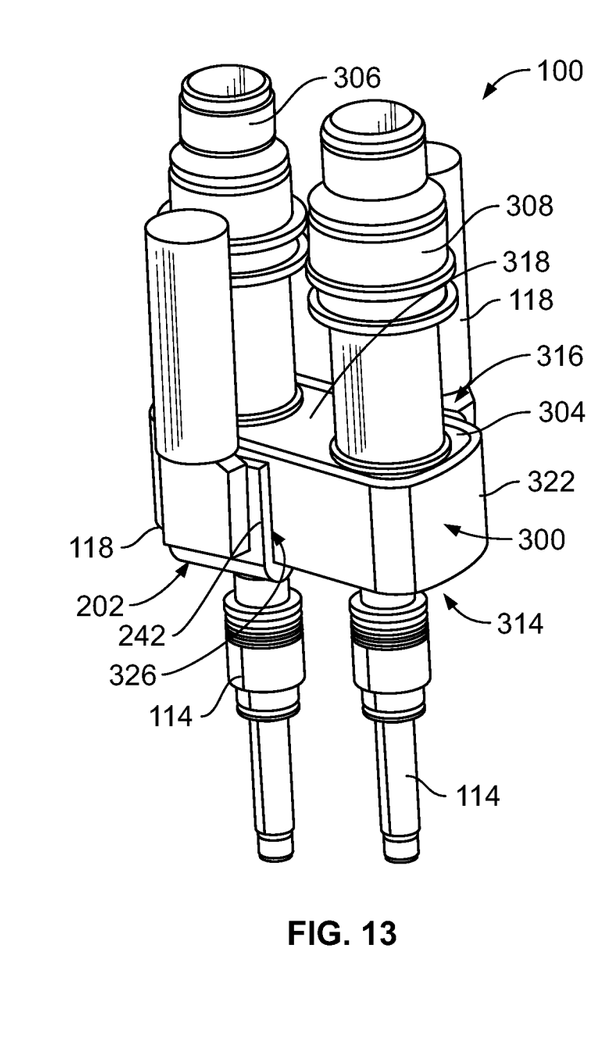
FIG. 13 is a rear perspective view of a portion of the charging inlet assembly in accordance with an exemplary embodiment with the outer housing removed to illustrate the heat exchanger.

FIG. 10 is a front perspective view of a portion of the charging inlet assembly 100 in accordance with an exemplary embodiment showing an outer housing 500. FIG. 11 is a rear perspective view of a portion of the charging inlet assembly 100 in accordance with an exemplary embodiment showing the outer housing 500. FIG. 12 is a front perspective view of a portion of the charging inlet assembly 100 in accordance with an exemplary embodiment with the outer housing 500 removed to illustrate the heat exchanger 300. FIG. 13 is a rear perspective view of a portion of the charging inlet assembly 100 in accordance with an exemplary embodiment with the outer housing 500 removed to illustrate the heat exchanger 300. In various embodiments, the outer housing 500 forms a support frame that surrounds the heat exchanger 300 and the pads 242 of the terminals 114. The outer housing 500 engages the heat exchanger 300 and/or the pads 242 to press the heat exchanger 300 against the pads 242. The support frame 400 may include fasteners, clips, latches or other securing features.

The heat exchanger 300 is configured to be coupled to the coolant supply line 132 and the coolant return line 134 (both shown in FIG. 2) at the supply port 138 and the return port 139, respectively. The heat exchanger 300 includes the internal coolant channel 302 (shown in phantom in FIGS. 12 and 13) to allow coolant flow through the heat exchanger 300 and transfer heat from the heat exchanger 300. The heat exchanger 300 is configured to be thermally coupled to the pads 242 of the terminals 114. The pair of power cables 118 are terminated to the pair of terminals 114. In an exemplary embodiment, the terminals 114 are received in the housing 110 such that the pads 242 face in opposite directions. For example, the pads 242 are oriented 180° relative to each other. The heat exchanger 300 is positioned between the pads 242.

The heat exchanger 300 includes the heat exchanger body 304 defining the coolant channel 302. The heat exchanger 300 includes the supply tube 306 and the return tube 308 extending from the heat exchanger body 304. The supply tube 306 extends to the supply port 138. The return tube 308 extends to the return port 139. The heat exchanger body 304 may be manufactured from a thermally conductive material, such as a metal material. The heat exchanger body 304 includes the side wall 322 extending between the front 314 and the rear 316 and the end wall 318. In an exemplary embodiment, the end wall 318 is thermally coupled to the bases 244 of the cable connectors 202 of the terminals 114 at the base thermal interfaces 324. The side wall 322 is thermally coupled to the pads 242 of the cable connectors 202 of the terminals 114 at the pad thermal interfaces 326.

The outer housing 500 includes a cavity 502 that receives the heat exchanger 300. The outer housing 500 includes strengthening ribs 504 for strengthening the structure of the outer housing 500. In an exemplary embodiment, the outer housing 500 includes multiple pieces, such as left and right pieces that are coupled together using clips, fasteners, latches or other securing features. The outer housing 500 is manufactured from a dielectric material, such as a plastic material. The outer housing 500 provides touch safety to prevent human contact with the pads 242 and the exposed portions of the power cables 118. The outer housing 500 increases creep distance between the electrically conductive portions of the pads 242 and power cables 118 and the heat exchanger body 304, which may be problematic with other surfaces contaminated with dust and dirt.

The outer housing 500 engages the heat exchanger body 304 to locate the heat exchanger body 304 relative to the outer housing 500. The outer housing 500 may include locating features for engaging and locating the heat exchanger body 304 in the cavity 502. The outer housing 500 may engage the pads 242 to locate the pads 242 relative to the outer housing 500. For example, the outer housing 500 may maintain axial alignment of the pads 242 relative to the heat exchanger body 304. In an exemplary embodiment, the outer housing 500 includes terminal locators 506 engaging the terminals 114 to locate the terminals relative to the outer housing 500. The terminal locators 506 may engage the pads 242 and/or the bases 244. The outer housing 500 may compress the pads 242 against the heat exchanger body 304 to maintain thermal engagement between the pads 242 and the heat exchanger body 304. The outer housing 500 prevents rotation or twisting of the pads 242 and the terminals 114.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power connector for of a vehicle comprising:
a housing extending between a front and a rear, the front defining a mating end configured to be mated with a charging connector, the rear configured to be coupled to the vehicle, the housing having a mounting flange mounted to the vehicle, the housing having a chamber at the rear, the housing having a terminal channel between the front and the rear;
a terminal coupled to the housing, the terminal including a mating pin at a front of the terminal and a cable connector at a rear of the terminal, the mating pin positioned in the terminal channel for mating with a socket terminal of the charging connector, the cable connector positioned in the chamber at the rear of the housing, the cable connector configured to be terminated to a power cable connected to a battery of the vehicle; and
a heat exchanger positioned in the chamber, the heat exchanger being thermally coupled to the cable connector of the terminal in the chamber at the rear of the housing, the heat exchanger including a coolant channel for coolant flow through the heat exchanger for actively cooling the terminal.

2. The power connector of claim 1, wherein the heat exchanger includes a thermally conductive separator electrically isolating the heat exchanger from the cable connector of the terminal.

3. The power connector of claim 1, wherein the heat exchanger includes a heat exchanger body and a heat exchanger lid coupled to the heat exchanger body, one of the heat exchanger body and the heat exchanger lid including an inlet coupled to a supply tube and one of the heat exchanger body and the heat exchanger lid including an outlet coupled to a return tube, the coolant channel extending between the inlet and the outlet for coolant flow between the inlet and the outlet.

4. The power connector of claim 1, wherein the heat exchanger includes a heat exchanger body and a heat exchanger lid, the heat exchanger lid being brazed to the heat exchanger body at a braze joint, one of the heat exchanger body and the heat exchanger lid including an inlet brazed to a supply tube at an inlet braze joint and one of the heat exchanger body and the heat exchanger lid including an outlet brazed to a return tube at a return braze joint, the coolant channel extending between the inlet and the outlet for coolant flow between the inlet and the outlet.

5. The power connector of claim 4, wherein the heat exchanger body includes an outer edge at a rear of the heat exchanger, the heat exchanger lid being received in the heat exchanger body at the rear, the heat exchanger lid including an outer edge, the heat exchanger having a ledge formed by the outer edge of the heat exchanger body and the outer edge of the heat exchanger lid, the ledge receiving the braze joint.

6. The power connector of claim 4, wherein the heat exchanger includes an inlet ledge at the inlet and an outlet ledge at the outlet, the inlet ledge receiving the inlet braze joint around the supply tube and the inlet ledge, the outlet ledge receiving the outlet braze joint around the return tube and the outlet ledge.

7. The power connector of claim 1, wherein the heat exchanger includes a heat exchanger body and a heat exchanger lid, the heat exchanger body having an end wall and a side wall forming a cavity, the heat exchanger lid having an end wall and a side wall extending from the end wall, the end wall of the heat exchanger lid being received in the cavity such that the side wall of the heat exchanger lid engages an interior surface of the side wall of the heat exchanger body, the side wall of the heat exchanger lid being brazed to the side wall of the heat exchanger body at a braze joint to enclose the cavity.

8. The power connector of claim 1, wherein the heat exchanger includes a heat exchanger body, a heat exchanger lid, and a diverter wall, the heat exchanger body forming a cavity, the diverter wall being received in the cavity, the heat exchanger lid coupled to the heat exchanger body to close the cavity, the diverter wall supporting the heat exchanger lid across the cavity.

9. The power connector of claim 8, wherein the heat exchanger body includes an end wall and a side wall, the side wall having a terminal interface facing the cable connector of the terminal, the diverter wall being positioned in the cavity adjacent the terminal interface to reduce a size of the coolant channel at the terminal interface.

10. The power connector of claim 1, wherein the cable connector of the terminal includes a base and a pad extending from the base, the heat exchanger including a heat exchanger body having an end wall and a side wall forming a cavity, the side wall having a pad terminal interface facing the pad and being in thermal communication with the pad, the end wall having a base terminal interface facing the base and being in thermal communication with the base.

11. The power connector of claim 10, wherein the cable connector is L-shaped with the pad oriented perpendicular to the base, the side wall being oriented perpendicular to the end wall.

12. The power connector of claim 1, wherein the heat exchanger includes a heat exchanger body having an inner surface and an outer surface, the inner surface forming a cavity defining the coolant channel, the heat exchanger including an electrical isolating coating applied to the outer surface at a terminal interface facing the cable connector of the terminal.

13. The power connector of claim 12, wherein the heat exchanger includes a thermally conductive separator electrically isolating the heat exchanger from the cable connector of the terminal, the electrical isolating coating engaging the thermally conductive separator to provide double electrical isolation layers between the terminal and the heat exchanger body, the heat exchanger body being thermally coupled to the terminal through the electrical isolating coating and the thermally conductive separator.

14. The power connector of claim 1, wherein the heat exchanger includes a thermally conductive separator electrically isolating the heat exchanger from the cable connector of the terminal, the thermally conductive separator including a thermally conductive gasket positioned between the cable connector of the terminal and the heat exchanger.

15. The power connector of claim 1, wherein the heat exchanger includes a supply tube and a return tube, the supply tube and the return tube having rear ends being parallel to the power cable.

16. The power connector of claim 1, further comprising a second terminal including a second mating pin and a second cable connector terminated to a second power cable, the second cable connector including a second cable connector, the heat exchanger being thermally coupled to the second cable connector of the second terminal.

17. The power connector of claim 16, wherein the heat exchanger is positioned between the cable connector and the second cable connector, the heat exchanger including a heat exchanger body having a first side and a second side, the first side facing and being thermally coupled to the cable connector, the second side facing and being thermally coupled to the second cable connector.

18. The power connector of claim 16, further comprising a cooling assembly including a cooling adapter coupled to the housing, the cooling adapter including an adapter body forming a cavity, the adapter body having a cable exit for the power cable, the cooling adapter including a supply port and a return port, a coolant supply line being coupled to the supply port, a coolant return line being coupled to the return port, wherein the supply port is coupled to an inlet of the heat exchanger and the return port is coupled to an outlet of the heat exchanger.

19. A charging inlet assembly of an electric vehicle comprising:
a housing extending between a front and a rear, the housing having a chamber at the rear, the housing having a power connector at the front having a receptacle for receiving a charging connector, the housing having a mounting flange mounted to the vehicle, the rear configured to be coupled to the electric vehicle, the power connector including a first terminal channel and a second terminal channel between the front and the rear;
a first terminal coupled to the housing, the first terminal including a first mating pin at a front of the first terminal and a first cable connector at a rear of the first terminal, the first mating pin positioned in the first terminal channel for mating with a socket terminal of the charging connector, the first cable connector positioned in the chamber at the rear of the housing, the first cable connector including a first pad configured to be terminated to a power cable connected to a battery of the vehicle;
a second terminal coupled to the housing, the second terminal including a second mating pin at a front of the second terminal and a second cable connector at a rear of the second terminal, the second mating pin positioned in the second terminal channel for mating with a socket terminal of the charging connector, the second cable connector positioned in the chamber at the rear of the housing, the second cable connector including a second pad configured to be terminated to a power cable connected to the battery of the vehicle; and
a heat exchanger positioned in the chamber, the heat exchanger including a heat exchanger body having a first terminal interface being thermally coupled to the first pad of the first terminal in the chamber at the rear of the housing and a second terminal interface being thermally coupled to the second pad of the second terminal in the chamber at the rear of the housing, the heat exchanger including a coolant channel for coolant flow through the heat exchanger for actively cooling the first terminal and the second terminal, the heat exchanger including a thermally conductive separator electrically isolating the heat exchanger from at least one of the first pad of the first terminal and the second pad of the second terminal.

20. The charging inlet assembly of claim 19, wherein the heat exchanger includes a thermally conductive separator electrically isolating the heat exchanger from at least one of the first pad of the first terminal and the second pad of the second terminal.

21. The charging inlet assembly of claim 20, further comprising a support frame surrounding the heat exchanger, the first pad and the second pad, the support frame pressing against the heat exchanger, the first pad and the second pad to compress the thermally conductive separator between the heat exchanger and at least one of the first pad and the second pad.

22. The charging inlet assembly of claim 19, wherein the first pad is offset from the second pad, the heat exchanger being positioned between the first pad and the second pad.

23. A power connector of a vehicle comprising:
a housing extending between a front and a rear, the front defining a mating end configured to be mated with a charging connector, the housing having a receptacle at the front for receiving the charging connector, the housing having a mounting flange coupled to the vehicle, the housing having a terminal channel between the front and the rear;
a terminal coupled to the housing, the terminal including a mating pin at a front of the terminal and a cable connector at a rear of the terminal, the mating pin positioned in the terminal channel for mating with a socket terminal of the charging connector, the cable connector positioned generally at the rear of the housing, the cable connector configured to be terminated to a power cable connected to a battery of the vehicle; and
a heat exchanger positioned generally at the rear of the housing, the heat exchanger including a coolant channel for coolant flow through the heat exchanger for actively cooling the terminal, the heat exchanger including a heat exchanger body forming a cavity, the heat exchanger body having a terminal interface being thermally coupled to the cable connector of the terminal in the chamber at the rear of the housing, the heat exchanger including a diverter wall received in the cavity adjacent the terminal interface to reduce a size of the coolant channel at the terminal interface.

24. The power connector of claim 23, the heat exchanger includes a heat exchanger lid coupled to the heat exchanger body to close the cavity, the diverter wall supporting the heat exchanger lid across the cavity.

25. The power connector of claim 23, wherein the diverter wall includes an opening adjacent the terminal interface of the heat exchanger body, the opening forming the coolant channel through the diverter wall.

26. The power connector of claim 23, wherein the diverter wall includes a tab bent out of plane from the diverter wall to form a diverter channel adjacent the terminal interface, the diverter channel forming a portion of the coolant channel, the diverter channel having a reduced area compared to other portions of the coolant channel to increase fluid flow through the diverter channels.

* * * * *